United States Patent
Feller et al.

(10) Patent No.: US 7,439,519 B2
(45) Date of Patent: Oct. 21, 2008

(54) NEUTRON DETECTION BASED ON COINCIDENCE SIGNAL

(75) Inventors: W. Bruce Feller, Tolland, CT (US); Paul L. White, Sturbridge, MA (US); Adrian Martin, Oakland, CA (US); P. Brian White, Palmer, MA (US); Oswald H. Siegmund, Walnut Creek, CA (US)

(73) Assignee: Nova Scientific, Inc., Sturbridge, MA (US)

( * ) Notice: Subject to any disclaimer, the term of this patent is extended or adjusted under 35 U.S.C. 154(b) by 0 days.

(21) Appl. No.: 11/522,795

(22) Filed: Sep. 18, 2006

(65) Prior Publication Data

US 2008/0067394 A1    Mar. 20, 2008

(51) Int. Cl.
    *G01T 3/00* (2006.01)
(52) U.S. Cl. .................................. 250/390.01
(58) Field of Classification Search ................................ 250/390.01–390.12
    See application file for complete search history.

(56) References Cited

U.S. PATENT DOCUMENTS

| | | | |
|---|---|---|---|
| 2,244,330 A | | 6/1941 | Dickens |
| 2,740,898 A * | 4/1956 | Youmans ..................... 376/153 |
| 4,481,421 A * | 11/1984 | Young et al. ........... 250/390.01 |
| 5,231,290 A | 7/1993 | Czirr et al. |
| 5,378,895 A * | 1/1995 | Cole et al. ............. 250/390.04 |
| 5,532,482 A * | 7/1996 | Stephenson .............. 250/269.4 |
| 5,635,711 A * | 6/1997 | Sloan et al. .................. 250/254 |
| 5,659,177 A | 8/1997 | Schulte et al. |
| 5,734,166 A | 3/1998 | Czirr |
| 5,973,328 A * | 10/1999 | Hiller et al. ............ 250/390.01 |
| 6,876,711 B2 * | 4/2005 | Wallace et al. .............. 376/154 |

FOREIGN PATENT DOCUMENTS

WO    98/12576    3/1998

OTHER PUBLICATIONS

White Paper: "Optimization of Low Cost, High Sensitivity Neutron Detector", Mission Research Corporation and Nova Scientific Inc., 6 pages.
Proposal No. T2-0088, Topic No. DTRA03-003. Nova Scientific Inc., 47 pages.
Feller et al., "Neutron field imaging with microchannel plates," *Proceedings of SPIE*, 4141:291-302 (2000).

* cited by examiner

*Primary Examiner*—David P. Porta
*Assistant Examiner*—Kiho Kim
(74) *Attorney, Agent, or Firm*—Fish & Richardson P.C.

(57) ABSTRACT

A method includes detecting a neutron based on a time proximity of a first signal and a second signal. The first signal indicates detection of at least one of a neutron and a gamma ray. The second signal indicates detection of a gamma ray.

33 Claims, 2 Drawing Sheets

NEUTRON DETECTION BASED ON COINCIDENCE SIGNAL

CROSS-REFERENCE TO RELATED APPLICATIONS

This application is related to concurrently filed U.S. patent application Ser. No. 11/522,855, titled "Neutron Detection", the contents of which are incorporated by reference.

BACKGROUND

This invention relates to neutron detection.

A neutron-sensitive microchannel plate (MCP) can be used to detect special nuclear materials (SNM), such as plutonium, or can be used in neutron imaging. An MCP can be formed by bonding a glass plate between an input electrode and an output electrode, and providing a high voltage direct current (DC) field between the electrodes. The glass plate is perforated with a substantially regular, parallel array of microscopic channels, e.g., cylindrical and hollow channels. Each channel, which can serve as an independent electron multiplier, has an inner wall surface formed of a semi-conductive and electron emissive layer.

The glass plate can be doped with, e.g., boron-10 particles, which can capture neutrons in reactions that generate lithium-7 and alpha particles. As the lithium-7 and alpha particles enter nearby channels and collide against the wall surfaces to produce secondary electrons, a cascade of electrons can be formed as the secondary electrons accelerate along the channels (due to the DC field), and collide against the wall surfaces farther along the channels, thereby increasing the number of secondary electrons. The electron cascades develop along the channels and are amplified into detectable signals that are electronically registered and processed to construct a digital image. The resultant intensity map or image corresponds to the variation in neutron flux striking the MCP surface. Contrast differences within the image of a sample can be used to infer physical and chemical properties.

SUMMARY

In one aspect, in general, a method includes detecting a neutron based on a time proximity of a first signal and a second signal, the first signal indicating detection of at least one of a neutron and a gamma ray, the second signal indicating detection of a gamma ray.

Implementations of the method may include one or more of the following features. The method includes generating the first signal using a microchannel plate detector. The method includes generating the second signal using a gamma ray detector. The method includes determining whether the second signal occurred within a specified time period after occurrence of the first signal. In some examples, the specified time period is less than 50 nanoseconds. In some examples, the specified time period is less than 10 nanoseconds. Detecting the neutron includes capturing the neutron using a boron-10 particle and generating alpha and lithium-7 particles. Detecting a neutron includes detecting a gamma ray within less than 50 ns after a microchannel plate detector generates an output pulse indicating detection of a neutron or a gamma ray.

In another aspect, in general, a method includes generating a first signal using a microchannel plate detector, the first signal indicating detection of at least one of a neutron and a gamma ray, generating a second signal using a gamma ray detector, the second signal indicating detection of a gamma ray, and generating a third signal indicating that a neutron has been detected by the microchannel plate detector if the second signal occurs within a predetermined time period after occurrence of the first signal.

Implementations of the method may include one or more of the following features. The method includes comparing a time difference between occurrence of the first signal and occurrence of the second signal. Generating the first signal includes generating the first signal using a microchannel plate detector. Generating the first signal includes generating an alpha particle and a lithium-7 particle, and inducing secondary electron emissions. The predetermined period of time is less than 50 nanoseconds.

In another aspect, in general, an apparatus includes a neutron detector that detects a neutron based on a time proximity of a first signal and a second signal, the first signal indicating detection of at least one of a neutron and a gamma ray, the second signal indicating detection of a gamma ray.

Implementations of the apparatus may include one or more of the following features. The neutron detector includes a microchannel plate detector that generates the first signal. In some examples, the microchannel plate detector includes glass doped with boron-10. In some examples, the microchannel plate detector includes glass doped with gadolinium. The neutron detector includes a gamma ray detector that generates the second signal. The neutron detector includes a signal processor that determines whether the second signal occurs within a specified time period after occurrence of the first signal. In some examples, the specified time period is less than 50 nanoseconds. In some examples, the specified time period is less than 10 nanoseconds.

In another aspect, in general, an apparatus includes a microchannel plate detector to generate a first detection signal upon detection of at least one of a neutron and a gamma ray, a gamma ray detector to generate a second detection signal upon detection of a gamma ray, and a signal processor to generate a third signal indicating a detection of a neutron upon receiving the first and second detection signals and determining that the second detection signal occurred within a predetermined period of time after occurrence of the first detection signal.

Implementations of the apparatus may include one or more of the following features. The microchannel plate detector includes glass doped with at least one of boron-10 and gadolinium. In some examples, the microchannel plate detector includes a first particle (e.g., boron-10) that, upon capture of a neutron, generates a second particle in an excited state that subsequently decays to a lower energy state and emits a gamma ray. The gamma ray detector includes a scintillator. The predetermined period of time is less than 50 nanoseconds.

The apparatus and method can have one or more of the following advantages. Neutron detection can be more accurate because interference from gamma rays in the environment can be reduced so that false positive detection of neutrons can be reduced. Materials that emit both neutrons and gamma rays can be distinguished from materials that only emit gamma rays.

Other features and advantages of the invention are apparent from the following description, and from the claims.

DESCRIPTION

Figure 1:
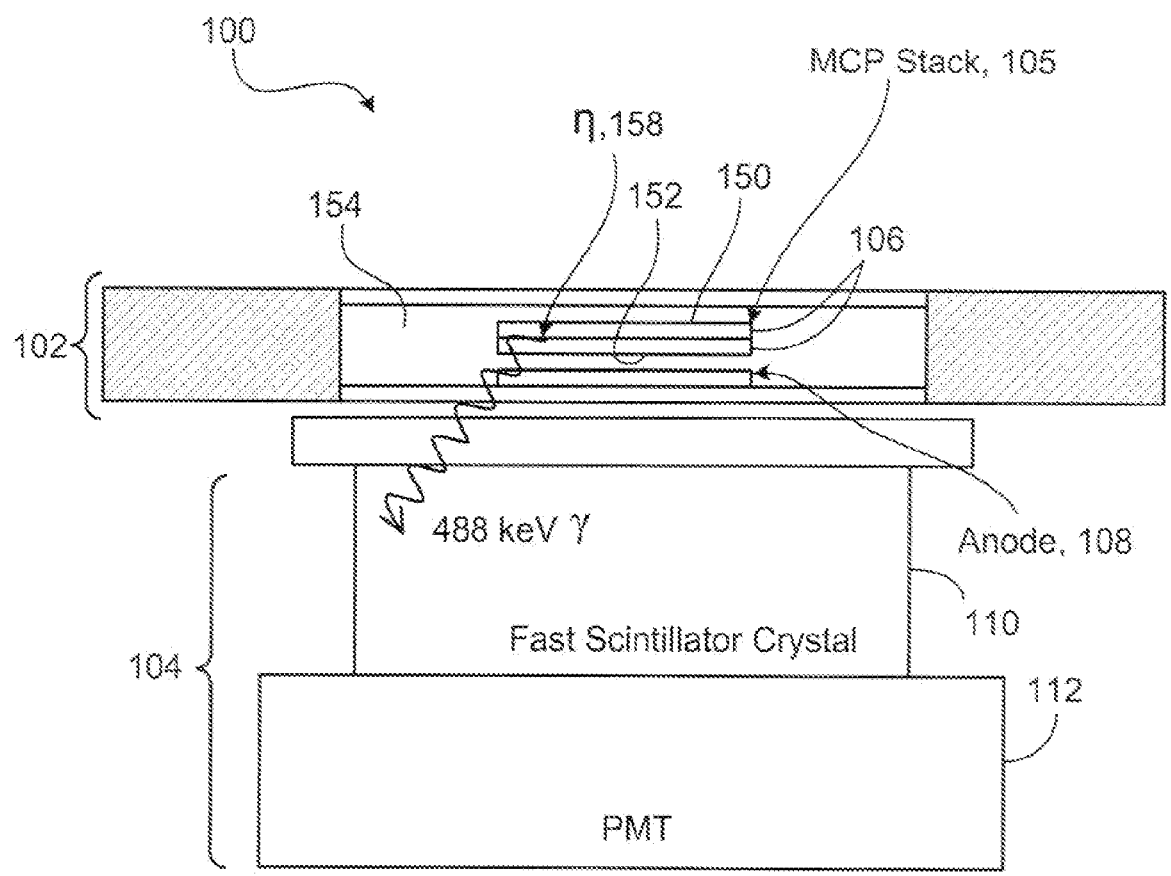
FIG. 1 is a schematic diagram of a neutron detector.

FIG. 1 is a schematic diagram of an example of a neutron detector 100 that includes an MCP detector 102 and a gamma ray detector 104. The MCP detector 102 includes an MCP stack 105 having one or more MCPs 106 stacked together. The MCP stack 105 has a top electrode 150 connected to a more negative voltage and a bottom electrode 152 connected to a more positive voltage. An anode 108 is provided to collect electron emissions from the MCP stack 105. The MCP stack 105 and the anode 108 are housed within a vacuum chamber 154. The MCPs 106 are sensitive to both neutrons and gamma rays. A readout signal from the anode 108 may indicate detection of a neutron or a gamma ray but typically does not provide information on whether a neutron or a gamma ray is detected.

For example, the MCP 106 can be model NVN-7, available from Nova Scientific, Inc., Sturbridge, Mass. The MCP 106 can be made of, e.g., a boron-10 or gadolinium doped alkali lead silicate glass having 5 mol% or more of boron-10 oxide, or 2 mol% or more of gadolinium oxide. The MCP 106 can be configured to have low sensitivity to gamma rays, as described in co-pending U.S. patent application Ser. No. 11/522,855, titled "Neutron Detection".

The gamma ray detector 104 includes a fast scintillator crystal 110 and a photomultiplier tube (PMT) 112. The scintillator crystal 110 emits scintillation light upon receiving a gamma ray, and the PMT 112 captures the scintillation light. For example, the scintillator crystal 110 can be a LaBr3:Ce scintillator crystal, BrilLianCe®380 crystal, from Saint-Gobain Crystals, Newbury, Ohio. The PMT 112 can be model 83112-502, available from Burle Industries.

By measuring a time proximity of a signal from the MCP 106 and a signal from the PMT 112, one can determine whether a neutron has been detected by the MCP detector 102. The signal from the MCP 106 indicates detection of a neutron or a gamma ray. The signal from the PMT 112 indicates detection of a gamma ray. As will be described in more detail below, detecting a signal from the PMT 112 shortly (e.g., within 100 ps) after detecting a signal from the MCP 106 indicates a high likelihood that a neutron absorption event accompanied by gamma ray emission has occurred.

The MCP 106 includes an array of microscopic channels each having a diameter of about, e.g., 5 microns. Each channel can have, e.g., a circular, square, rectangular, or hexagonal cross section. Each channel serves as an independent electron multiplier and has an inner wall surface formed of a semiconductive and electron emissive layer.

The microchannel plate 106 includes boron-10 doped glass that form the walls that define the channels. When a boron-10 particle captures a neutron 158, an alpha particle ($^4$He) and a lithium-7 particle are released, as in the reaction below:

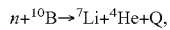

$$n + {}^{10}B \rightarrow {}^{7}Li + {}^{4}He + Q,$$

where Q is the energy released in the reaction. One or both of the lithium-7 and helium-4 particles pass out of the glass and enter one or more adjacent channels, freeing electrons along the way. The bottom electrode 152 of the MCP stack 105 has a more positive DC bias voltage than the top electrode 150 of the MCP stack 105. The DC bias voltage generates an electric field (e.g., about 1 kV/mm) that attracts the free electrons toward the bottom electrode 152. As the electrons bounce against the channel walls, more electrons are released. The signal at the bottom electrode 152 is read out and sent to a signal processor, such as a coincidence unit 136 (see FIG. 2), for comparison with a readout signal from the PMT 112.

The MCP detector 102 can also detect gamma rays (with an efficiency of about 1% to 3%, which is typical of lead-containing MCP glasses) that cause cascades of electrons in the channels. Thus, when the MCP detector 102 generates a detection signal, the detection signal can indicate either detection of a neutron or detection of a gamma ray.

In order to determine whether the MCP detector 102 detected a neutron or a gamma ray, the scintillator crystal 110 having a fast response is used to detect a gamma ray that is generated as a result of the neutron capture reaction. When boron-10 captures a neutron, the boron-10 nucleus fissions into an alpha particle (helium-4 ion) and a lithium-7 ion traveling in opposite directions. There is about 94% probability that the lithium-7 ion will initially be in an excited state, upon which the lithium-7 ion decays to a lower energy state and emits a 478 keV gamma ray. If the gamma ray travels towards the scintillator crystal 110, the gamma ray can be detected by the gamma ray detector 104.

When a neutron 158 is detected by the MCP detector 102, there is a likelihood that the gamma ray detector 104 will also detect a prompt gamma ray from the reaction within a very short period of time, e.g., less than 100 ps. Thus, by detecting coincidence events in which a signal from the gamma ray detector 104 occurs within a timing coincidence window of about, e.g., 10 ns, of the occurrence of a signal from the MCP detector 102, a valid neutron event can be positively tagged with high confidence. The timing coincidence window of about 10 ns is short enough to statistically exclude most background gamma rays (even with gamma flux rates in the MHz region).

An advantage of the neutron detector 100 is that by detecting coincidence between signals from the MCP detector 102 and the gamma ray detector 104, false positive detection of neutrons can be reduced significantly.

Figure 2:
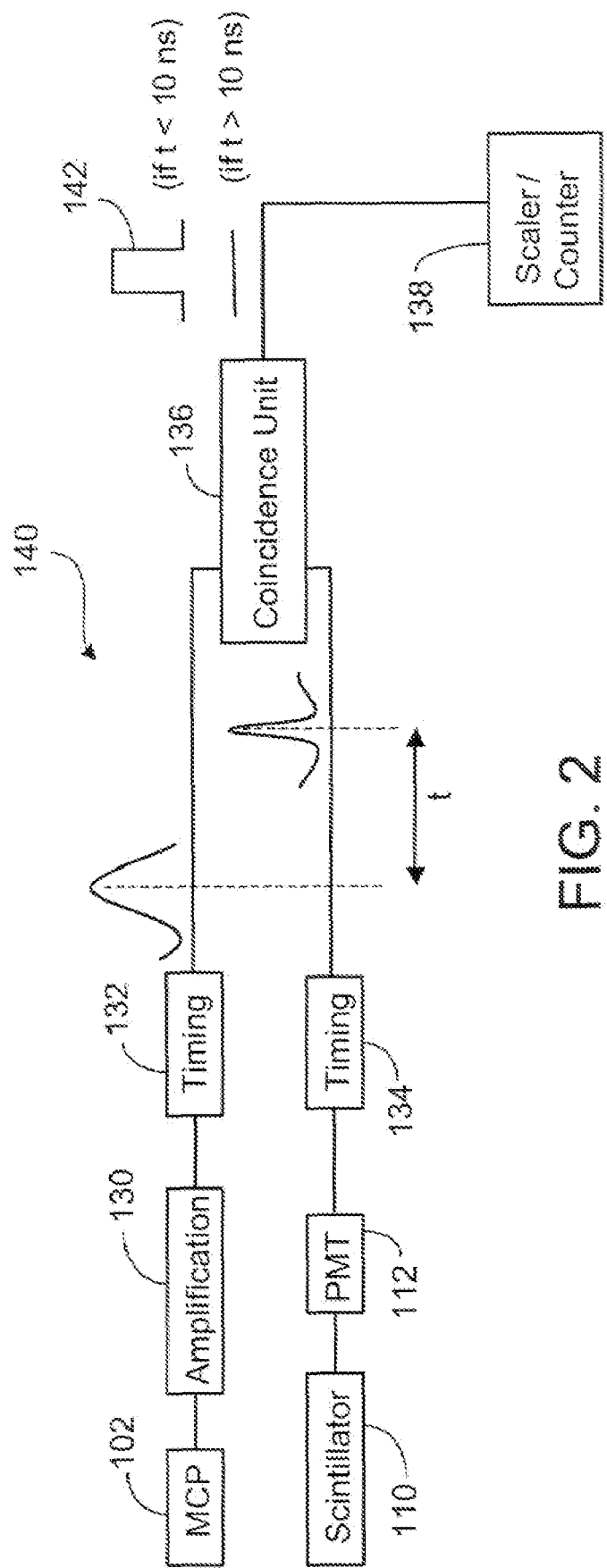
FIG. 2 is a block diagram of a neutron detection system

FIG. 2 is a block diagram of a neutron detection system 140 that can determine the neutron flux, i.e., the amount of neutrons per second, emitted from an object. The neutron detection system 140 includes an MCP detector 102, a scintillator 110, and a PMT 112, similar to those shown in FIG. 1. The output signal of the MCP detector 102 is sent to an amplifier 130 to amplify the signals received at the anode 108 of the MCP detector 102, and the output of the amplifier 130 is sent to a timing module 132. The output of the PMT 112 is sent to a timing module 134. The timing modules 132 and 134 condition the signals from the MCP detector 102 and PMT 112, taking into consideration the different signal paths traveled by the signals from the MCP detector 102 and PMT 112 to the coincidence unit 136. The outputs of the timing modules 132 and 134 are sent to the coincidence unit 136, which determines whether the signal from the timing module 134 occurs within the timing coincidence window (e.g., 10 ns) of the signal from the timing module 132. The coincidence unit 136 can be, e.g., model 2040, from Canberra, Meriden, Conn.

The coincidence unit 136 determines a time difference between a signal received from the timing module 132 and a later signal received from the timing module 134, and compare the time difference with the present timing coincidence window. If the time difference is less than the timing coincidence window (e.g., 10 ns), the coincidence unit 136 generates a pulse 142 that is sent to a scaler/counter 138, indicating a neutron event. The counter 138 can be configured to count the number of neutron events per unit of time (e.g., second). The counter 138 can be, e.g., model 512, from Canberra. The output signal of the counter 138 can be sent to a computer or data acquisition device for recording and analysis of the signal.

If there is no coincidence within 10 ns between the output signals of the MCP detector 102 and the scintillator 110, then either (i) a gamma ray of arbitrary energy is detected by the MCP detector 102, and no 478 keV gamma ray is detected by the scintillator 110 within the 10 ns timing window, or (ii) a gamma ray is detected by the scintillator 110 but no corresponding neutron signal is detected by the MCP detector 102.

The probability that a 478 keV gamma ray is detected within a 10 ns timing window, and another background gamma ray of any energy being detected by the MCP detector 102 (which has 1% to 3% detection efficiency to gamma rays), is very small. Because there is about 94% probability that the boron-10 and neutron reaction will generate a lithium-7 ion in the excited state that decays with an emission of a 478 keV gamma ray, there is a probability of about 6% that neutron events would not result in an emission of a 478 keV gamma ray. Of the 478 keV gamma rays that are emitted isotropically, about 16% can be detected by the scintillator crystal 110 that is placed on the bottom side of the MCP detector 102. Using two larger scintillator crystals, one above and one below the MCP detector 102, can significantly increase the detection rate of the gamma rays, due to larger solid angle capture.

It is to be understood that the foregoing description is intended to illustrate and not to limit the scope of the detector described herein. Other embodiments are within the scope of the following claims. For example, in FIG. 1, the anode 108 is optional and can be removed. The PMT 112 can be replaced by an avalanche photodiode. The anode 108 can be a pixilated image sensor that can form images based on the detected neutrons. In this case, the neutron detector 100 can be used for neutron imaging. The gamma ray scintillator can be configured to substantially surround the MCP detector 102 (e.g., cover $4\pi$ steradians solid angle relative to the MCP detector 102) to capture as many gamma rays resulting from the neutron capture reaction as possible. The timing coincidence window can have values different from what is described above, e.g., about 10 to 50 ns. A neutron shield can be positioned between the MCP detector 102 and the gamma ray detector 104 to shield the detector 104 from neutrons.

Instead of using boron-10 to capture neutrons, other materials can also be used. For example, the MCPs 106 can be made of glass doped with gadolinium (Gd) that can capture neutrons as in the following reactions:

$n + {}^{155}Gd \rightarrow {}^{156}Gd + \text{gamma rays} + \text{beta particles} + Q\ (7.9\ \text{MeV})$ $n + {}^{157}Gd \rightarrow {}^{158}Gd + \text{gamma rays} + \text{beta particles} + Q\ (8.5\ \text{MeV})$ When gadolinium atoms capture neutrons, gamma rays are emitted simultaneously and can be detected by the gamma ray detector 104.

Elements of different embodiments described above may be combined to form embodiments not specifically described herein. Other implementations not specifically described herein are also within the scope of the following claims.

What is claimed is:

1. A method comprising:
   detecting a neutron based on a time proximity of a first signal and a second signal, the first signal indicating detection of at least one of a neutron and a gamma ray, the second signal indicating detection of a gamma ray; and
   generating a detection signal indicating detection of a neutron if the second signal occurred within a specified time period after occurrence of the first signal.

2. The method of claim 1, further comprising generating the first signal using a microchannel plate detector.

3. The method of claim 1, further comprising generating the second signal using a gamma ray detector.

4. The method of claim 1, further comprising determining whether the second signal occurred within the specified time period after occurrence of the first signal.

5. The method of claim 4, wherein the specified time period is less than 50 nanoseconds.

6. The method of claim 4, wherein the specified time period is less than 10 nanoseconds.

7. The method of claim 1, wherein detecting the neutron comprises capturing the neutron using a boron-10 particle and generating alpha and lithium-7 particles.

8. The method of claim 1, wherein detecting a neutron comprises detecting a gamma ray within less than 50 ns after a microchannel plate detector generates an output pulse indicating detection of a neutron or a gamma ray.

9. The method of claim 1, comprising generating the second signal upon detecting a 478 keV gamma ray.

10. The method of claim 1, wherein detecting the neutron comprises capturing the neutron using a first gadolinium particle and generating a second gadolinium particle, gamma rays, and beta particles.

11. The method of claim 10, wherein the first gadolinium particle comprises ${}^{155}Gd$ and the second gadolinium particle comprises ${}^{156}Gd$.

12. The method of claim 10, wherein the first gadolinium particle comprises ${}^{157}Gd$ and the second gadolinium particle comprises ${}^{158}Gd$.

13. A method comprising:
   generating a first signal using a microchannel plate detector, the first signal indicating detection of at least one of a neutron and a gamma ray;
   generating a second signal using a gamma ray detector, the second signal indicating detection of a gamma ray; and
   generating a third signal indicating that a neutron has been detected by the microchannel plate detector if the second signal occurs within a predetermined time period after occurrence of the first signal.

14. The method of claim 13, further comprising comparing a time difference between occurrence of the first signal and occurrence of the second signal.

15. The method of claim 13, wherein microchannel plate detector comprises at least one of ${}^{10}B$, ${}^{155}Gd$, and ${}^{157}Gd$.

16. The method of claim 13, wherein generating the first signal comprises:
   generating an alpha particle and a lithium-7 particle; and
   inducing secondary electron emissions.

17. The method of claim 13, wherein the predetermined period of time is less than 50 nanoseconds.

18. The method of claim 13, wherein generating the first signal comprises generating a gadolinium particle, gamma rays, and beta particles.

19. An apparatus comprising:
   a neutron detector to generate a detection signal indicating that a neutron has been detected, the neutron detector generating the detection signal if a second signal occurs within a predetermined time period after occurrence of a first signal, the first signal indicating detection of at least one of a neutron and a gamma ray, the second signal indicating detection of a gamma ray.

20. The apparatus of claim 19, wherein the neutron detector comprises a microchannel plate detector that generates the first signal.

21. The apparatus of claim 20, wherein the microchannel plate detector comprises glass doped with boron-10.

22. The apparatus of claim 20, wherein the microchannel plate detector comprises glass doped with gadolinium.

23. The apparatus of claim 19, wherein the neutron detector comprises a gamma ray detector that generates the second signal.

24. The apparatus of claim 19, wherein the neutron detector comprises a signal processor that determines whether the second signal occurs within the specified time period after occurrence of the first signal.

25. The apparatus of claim 24, wherein the specified time period is less than 50 nanoseconds.

26. The apparatus of claim 24, wherein the specified time period is less than 10 nanoseconds.

27. An apparatus comprising:
  a microchannel plate detector to generate a first detection signal upon detection of at least one of a neutron and a gamma ray;
  a gamma ray detector to generate a second detection signal upon detection of a gamma ray; and
  a signal processor to generate a third signal indicating a detection of a neutron upon receiving the first and second detection signals and determining that the second detection signal occurred within a predetermined period of time after occurrence of the first detection signal.

28. The apparatus of claim 27, wherein the microchannel plate detector comprises glass doped with at least one of boron-10 and gadolinium.

29. The apparatus of claim 27, wherein the microchannel plate detector comprises a first particle that, upon capture of a neutron, generates a second particle in an excited state that subsequently decays to a lower energy state and emits a gamma ray.

30. The apparatus of claim 27, wherein the gamma ray detector comprises a scintillator.

31. The apparatus of claim 27, wherein the predetermined period of time is less than 50 nanoseconds.

32. A method comprising:
  generating a first signal indicating detection of at least one of a neutron and a gamma ray;
  generating a second signal indicating detection of a gamma ray; and generating a detection signal indicating that a neutron has been detected if the second signal occurs within a predetermined time period after occurrence of the first signal.

33. The method of claim 32, wherein generating the first signal comprises generating the first signal using a micro channel plate detector comprising at least one of $^{10}$B, $^{155}$Gd, and $^{157}$Gd.

* * * * *

UNITED STATES PATENT AND TRADEMARK OFFICE
CERTIFICATE OF CORRECTION

| | | |
|---|---|---|
| PATENT NO. | : 7,439,519 B2 | Page 1 of 1 |
| APPLICATION NO. | : 11/522795 | |
| DATED | : October 21, 2008 | |
| INVENTOR(S) | : W. Bruce Feller et al. | |

It is certified that error appears in the above-identified patent and that said Letters Patent is hereby corrected as shown below:

In the specification

Col. 1, after line 10, please include the following paragraph:

-- STATEMENT REGARDING FEDERALLY SPONSORED RESEARCH OR DEVELOPMENT

This invention was made with government support under Defense Threat Reduction Agency contract HDTRA1-05-C-0023. The government has certain rights in the invention. --

Signed and Sealed this
Twenty-sixth Day of April, 2016

Michelle K. Lee
*Director of the United States Patent and Trademark Office*